J. P. HISE.
RACK FOR WAGON BRAKES.
APPLICATION FILED SEPT. 17, 1913.

1,149,051.

Patented Aug. 3, 1915.

Witnesses
Chas. L. Griesbauer.
E. B. McBath

Inventor
J. P. Hise,
By Chas E Brock
Attorney

UNITED STATES PATENT OFFICE.

JOHN PAUL HISE, OF HIGHTOWN, VIRGINIA, ASSIGNOR TO THE HISE WAGON BRAKE COMPANY, OF MARLINTON, WEST VIRGINIA, A CORPORATION OF WEST VIRGINIA.

RACK FOR WAGON-BRAKES.

1,149,051.  Specification of Letters Patent.  Patented Aug. 3, 1915.

Application filed September 17, 1913. Serial No. 790,264.

*To all whom it may concern:*

Be it known that I, JOHN P. HISE, a citizen of the United States, residing at Hightown, in the county of Highland and State of Virginia, have invented a new and useful Improvement in Racks for Wagon-Brakes, of which the following is a specification.

This invention relates to a rack for wagons and while not limited to use with any particular form of brake or lever, is especially adapted for use with the wagon brake shown and described in my Patent #1,045,978.

In the construction shown in the patent above referred to it was necessary to use an extra cross piece for the purpose of supporting the rack bar. This is avoided in my present construction by so forming the rack bar that it can be supported at the front end by the cross beam supporting the brake beam and at the rear end by the bolster, and I have further improved the rack by forming the same in two sections adjustable with respect to each other so that the rack can be supported as above mentioned in cases where the distance between the bolster and the said beam varies, without moving either of said parts.

Figure 1:
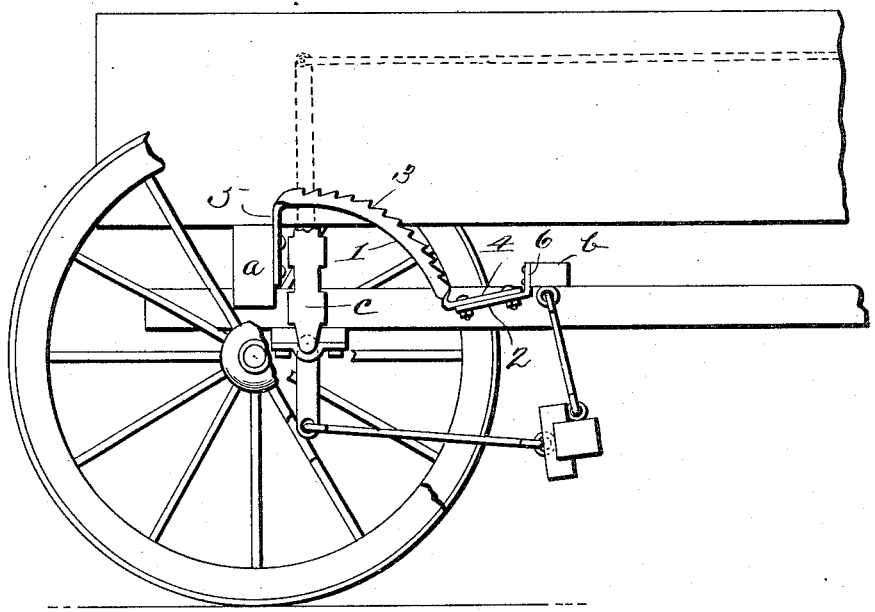
Figure 2:
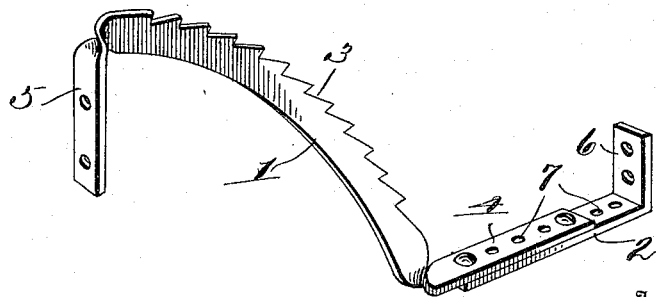

In the accompanying drawings, Figure 1 is a side elevation showing my improved form of rack in position. Fig. 2 is a perspective view of the rack shown detached.

In the drawings, I have shown a rack comprising the sections 1 and 2, the section 1 having a toothed curved portion 3, a straight forwardly extending portion 4 and a rear depending portion 5. The depending portion 5 is adapted to be secured to the front of the wagon bolster *a*. The section 2 has an up-turned end portion 6, which is adapted to be secured to the rear face of the cross beam *b*. The portion 2 overlaps the straight portion 4 and these overlapping portions are provided with perforations 7 through which suitable bolts or other means may be passed in order to fasten said sections together. The brake operating lever *c*, the lower portion of which only is shown, of course works over the curved portion of the section 1. This operating lever is preferably moved farther rearward with a rack bar of this construction than with one supported as shown in my previous patent. The advantages of this construction will be obvious as it not only avoids placing the extra cross piece across the wagon hounds but it affords a firmer support for the rear end of the rack bar and by forming the same in sections the rack bar can be applied to any wagon without making it necessary to shift the position of the beam *b* which if shifted would also make it necessary to re-adjust other parts of the brake mechanism. The making of the rack bar adjustable in length avoids this.

What I claim is:—

The combination with a brake beam supporting bar and the bolster of a wagon, of a rack bar formed in two sections, said sections being adjustable with respect to each other, one of said sections having a curved intermediate portion provided with rack teeth, a vertical angled end portion adapted to be secured to the front face of the bolster, and a forwardly extending front end portion adapted to overlap the other section, the second section comprising an angled bar adapted to overlap the section having the curved portion and to be secured to the rear face of the brake beam supporting bar, and means for securing the sections together.

JOHN PAUL HISE.

Witnesses:
ANDREW L. JONES,
R. A. JONES.

Copies of this patent may be obtained for five cents each, by addressing the "Commissioner of Patents. Washington, D. C."